April 2, 1946.   H. C. FORD   2,397,783
COMPUTING INSTRUMENT
Original Filed Feb. 1, 1928   2 Sheets-Sheet 1

INVENTOR
Hannibal C. Ford
BY Moakley & Gill
ATTORNEYS

April 2, 1946.   H. C. FORD   2,397,783
COMPUTING INSTRUMENT
Original Filed Feb. 1, 1928   2 Sheets-Sheet 2

INVENTOR
Hannibal C. Ford
BY Moakley & Gill
ATTORNEYS

Patented Apr. 2, 1946

2,397,783

UNITED STATES PATENT OFFICE 2,397,783

COMPUTING INSTRUMENT

Hannibal C. Ford, Jamaica, N. Y., assignor to Ford Instrument Company, Inc., Long Island City, N. Y., a corporation of New York Application February 1, 1928, Serial No. 250,988
Renewed March 14, 1934

24 Claims. (Cl. 235—61.5)

This invention relates to computing instruments and more particularly to instruments for computing values of quantities which vary non-uniformly with respect to other quantities, such for instance as ballistic data relating to fire control problems.

In such cases the quantities to be determined vary from a straight line plotted with respect to coordinate axes. It is an object of the invention to produce an instrument of simple construction for obtaining the values of the required quantities by algebraically combining the amounts by which they vary from a straight line function with the values of such function.

In general the instrument consists of a three dimensional cam of such shape that the radius of the external contour at any particular axial position represents the value by which the desired quantity differs from the straight line function. Coacting with the cam is a follower, the movement of which is proportional to such differences of the desired quantity. By means of a suitable follow-up system the displacements of the follower are communicated to a device by which they are combined with the corresponding values of the straight line function to give the resultant values of the desired quantity.

The invention further contemplates the provision of other cam mechanism for introducing corrections for differences in factors which affect the values of the desired quantities.

The particular nature of the invention as well as other objects and advantages thereof will appear most clearly from a description of a preferred embodiment thereof as shown in the accompanying drawing in which for purpose of illustration the instrument has been shown for computing super-elevation, that is, the angle, above the line from a gun to the point of aim of a projectile, which must be given to the gun to allow for the curvature of the trajectory of the projectile. The super-elevation angle varies for the same range from a maximum for a surface target to zero for an aerial target directly over the gun.

Figure 1:
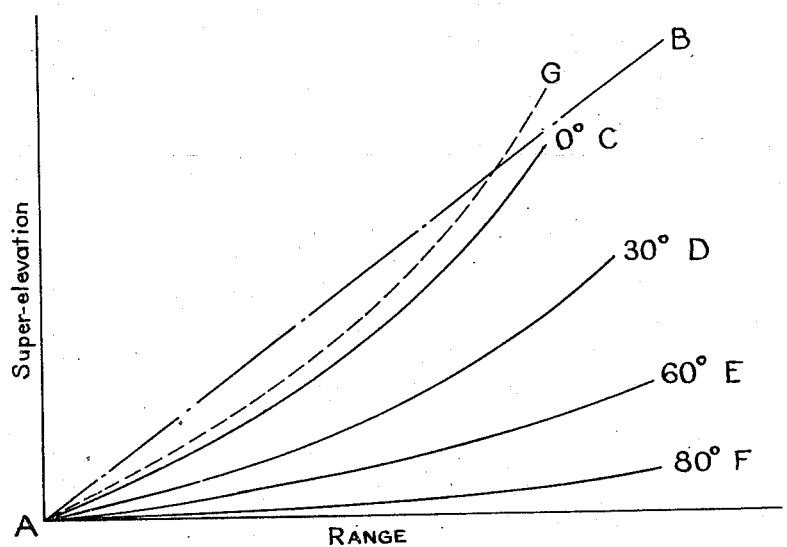
Figure 2:
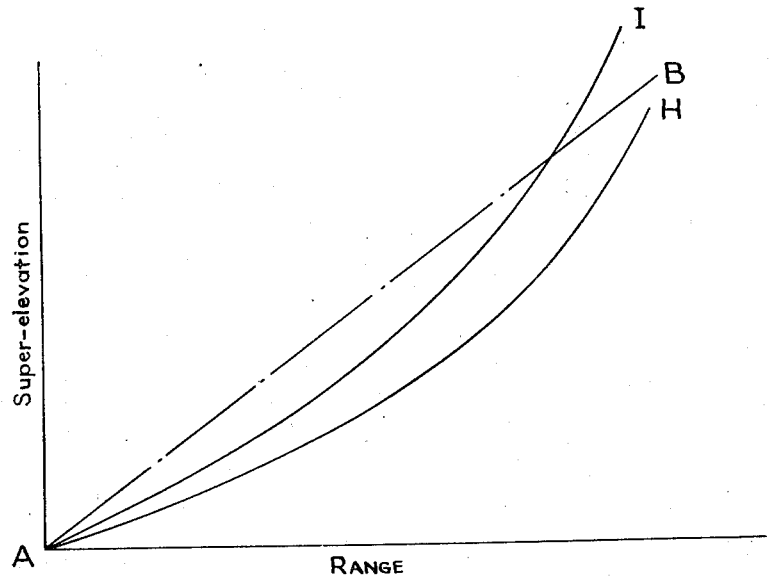
Figure 3:
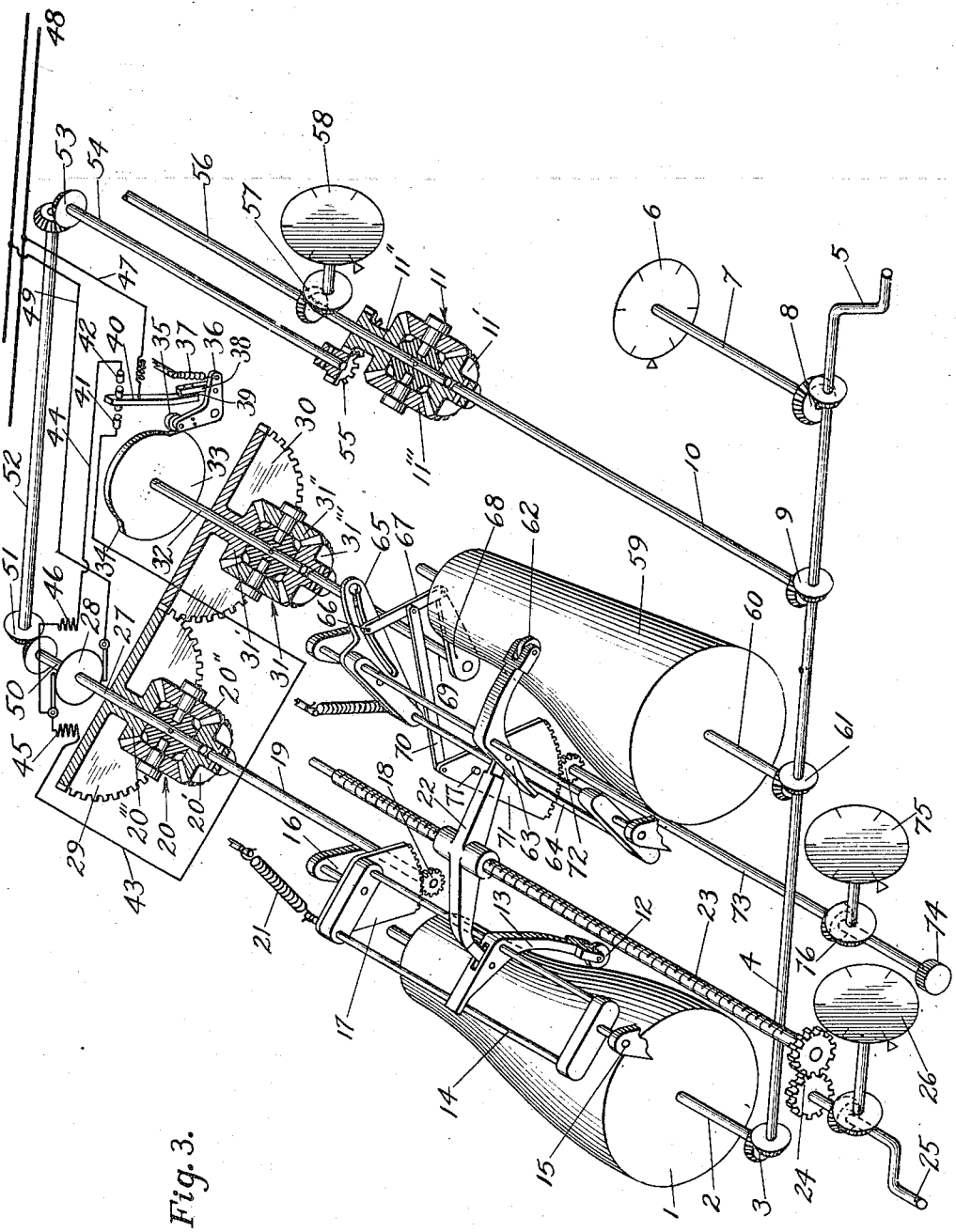

In the drawings Fig. 1 is a diagram showing the ballistic curves of super-elevation for different angles of altitude of a target, Fig. 2 is a diagram showing super-elevation curves for two types of guns and Fig. 3 is a diagram in simplified form of the computing instrument.

In Fig. 1, the abscissa represent ranges to the point of aim of a projectile and the ordinates the values of super-elevation. If the latter quantity varied uniformly with respect to range the relation between them would be represented by a straight line A—B. This is not the case however and the curve A—C represents the super-elevation angles for various ranges for an altitude of zero degrees, that is, for a surface target. Similarly other curves, such as A—D, A—E, and A—F represent the values of super-elevation angles for greater angles of altitude, such as 30°, 60° and 80°. The curves referred to above are based upon the assumption that maximum charges are used in the gun so that its projectiles have full initial velocity. If a reduced charge be used, or as a result of erosion due to previous firing the initial velocity is reduced, the super-elevation required for the gun must be increased. The broken line curve A—G of Fig. 1 therefore represents the super-elevation for a reduced initial velocity as compared with the initial velocity on which the curve A—C is based. For the sake of simplicity the super-elevation curves for reduced initial velocity have been shown for one elevation only.

Not only does the invention provide for applying corrections for reduced initial velocities but it also provides for taking care of the different ballistics of different types of guns. In Fig. 2 the line A—B corresponds to that of Fig. 1 and the lines A—H and A—I represent the super-elevation curves for two different types of guns for a particular altitude.

In Fig. 3, I represents a cam adapted to be rotated by shaft 2 connected by bevel gears 3 to a shaft 4 provided with a crank 5. The shaft is adapted to be rotated in accordance with values of the range R of the point of aim of a projectile, such values being indicated by a dial 6 on a shaft 7 connected to shaft 4 by bevel gears 8. The cam may thus be rotated in accordance with values of range. The shaft 4 also drives through bevel gears 9 a shaft 10 which is connected to one side 11' of a differential 11, the remaining elements of which will be hereinafter described.

Coacting with the cam 1 is a follower 12 consisting of a roller at the end of an arm 13 slidably mounted upon a frame 14 pivotally mounted in supports 15 and 16 and having at one end a gear sector 17 meshing with a pinion 18 on a shaft 19 connected to one side 20' of a differential 20. A spring 21 connected to one side of the frame holds the follower in contact with the cam.

The follower is adapted to be moved axially of the cam in accordance with the altitude angle A of the point of aim of a projectile by an arm 22 mounted upon a screw 23 which is connected by gears 24 to a crank 25. A dial 26 geared to crank 25 shows the values of the altitude angle A.

The center 20″ of differential 20 is connected by a shaft 27 to the armature 28 of a motor, while the other side 20‴ is connected by a gear 29 to a gear 30 connected to one side 31′ of a differential 31, the center 31″ of which is connected by a shaft 32 to a disc 33 provided with cam faces 34 with which a roller 35 on a bell crank lever 36 coacts, the roller being held against the cam face by a spring 37. A piece 38 is attached to one arm of lever 36 and carries a contact arm 40 separated therefrom by insulation 39. The arm coacts with contacts 41 and 42, connected by conductors 43 and 44 respectively with the reversely wound field coils 45 and 46 respectively of the motor. The contact arm 40 is connected by conductor 47 with one of a pair of direct current mains 48 the other of which is connected by conductor 49 to one brush of the motor, the other brush being connected to the field coils. The motor drives through shaft 50 and bevel gears 51 a shaft 52 which is connected by bevel gears 53 to a shaft 54 connected in turn by a pinion 55 to the side 11″ of the differential 11. The center 11‴ of the differential is attached to a shaft 56 which through bevel gears 57 drives a super-elevation dial 58.

A correctional cam 59 is connected by a shaft 60 and bevel gears 61 to the range shaft 4. The follower 62 of this cam is similar to that of cam 1 and its arm 63 is mounted upon a frame 64 which at one end is provided with a slotted portion 65 within which is a pin 66 on the end of a link 67. The other end of the link is connected to an arm 68 on a shaft 69 attached to the side 31‴ of differential 31. The link 67 is connected by a link 70 to a gear sector 71 which is pivoted on the pin 77 and meshes with a pinion 72 on a shaft 73 adapted to be turned by a knob 74 in accordance with the initial velocity of the projectile, the values of this velocity being shown by a dial 75 connected to the shaft by bevel gears 76.

In the operation of the instrument the shaft 4 will be rotated in accordance with ranges to the point of aim of the projectile the dial 6 showing the values being set up in the instrument. As a result of the rotation of the shaft 4 the cams 1 and 59 will be rotated in accordance with range values. At the same time the values of the angle of the point of aim of the projectile will be put into the instrument by the crank 25, these values being shown upon the dial 26. Through the gears 24 and screw shaft 23, the arm 22 will be properly positioned and will adjust the followers 12 and 62 axially of the cams in accordance with the altitude angle of the point of burst of the projectile. By means of the knob 74, shaft 73, pinion 72, gear sector 71 and link 70, the link 67 will be positioned in accordance with the value of the initial velocity of the projectile as shown by dial 75. The parts are so proportioned that for the maximum initial velocity the link 67 will be in line with the pivotal axis of the frame 64 so that as the latter turns about its axis due to varying positions of the roller 62 no movement will be imparted to the arm 68 and the shaft 69. The side 31‴ of differential 31 will therefore be fixed.

As the follower 12 is positioned by the rotation of cam 1 and axial displacement by the screw shaft 23, frame 14 on which it is mounted will be turned about its pivotal axis in the supports 15 and 16, the follower 12 being always held against the surface of the cam by spring 21. The movement imparted to the frame 14, will through gear sector 17, pinion 18 and shaft 19 turn the side 20′ of differential 20. Since the center 20″ of the differential is held fixed because it is connected to the motor armature 28 by shaft 27, the other side 20‴ will be turned and through the gears 29 and 30 the side 31′ of differential 31 will be correspondingly turned. Since the side 31‴ of this differential is held fixed as previously described its center 31″ will turn and through shaft 32 turn the disc 33 to alter the position of roller 35 and thereby shift the contact arm 40 into engagement with one or the other of the contacts 41 or 42 according to the direction of movement of the frame 14.

As a result of the operations described above a circuit will be established through the armature 28 of the motor and one or the other of its field windings 45 or 46 over conductor 47, contact arm 40, contact 41, conductor 43, field winding 45, motor armature 28 and conductor 49 on the one hand or conductor 47, contact arm 40, contact 42, conductor 44, field winding 46, motor armature 28 and conductor 49 on the other hand. The resultant rotation of the armature will turn the center 20″ of differential 20 and, regarding the side 20′ as fixed, the side 20‴ will be turned in such a direction as to turn through gears 29 and 30 the side 31′ of differential 31, its center 31″ and the disc 33 in the reverse direction to bring it into its normal relation to roller 35. There is thus provided in effect a follow-up system by which the motor is actuated in accordance with the position of the follower 12 with respect to cam 1. Through shaft 50, gears 51, shaft 52, gears 53, shaft 54 and pinion 55 the side 11″ of differential 11 will be correspondingly positioned. Since the side 11′ of this differential will be positioned from the shaft 4 through gears 9 and shaft 10 in accordance with the assumed straight line function between super-elevation and range, the resultant movement of the center 11‴ of the differential will be in accordance with the required super-elevation angle which will be indicated by dial 58 through shaft 56 and gears 57. In other words, the side 11′ will be turned in accordance with the values of the line A—B of Fig. 1 while the side 11″ will be turned in accordance with the amount the curve A—C differs from the line A—B, for instance, thereby subtracting from line A—B the differences between it and the curve to give the desired values of super-elevation as represented by the ordinates of the curve A—C, which are the values indicated by the super-elevation dial 58. Similarly values representing the curves A—D, A—E, and A—F, or intermediate values will be indicated. It is obvious that by a suitable transmission system actuated by shaft 56 the super-elevation values may be transmitted to other points, such as the guns, but as such a system forms no part of the present invention none has been shown.

When for any reason the projectiles are being fired at reduced initial velocities such velocities are put into the instrument by knob 74 which through shaft 73, pinion 72, gear sector 71 and link 70 alters the position of link 67 from that previously described to one in which the movement of frame 64, as the follower 62 conforms to the surface of the cam 59, causes a movement of arm 68 and shaft 69 to displace the side 31‴ of differential 31 from the position it occupies for maximum initial velocity. Hence the movement imparted to the cam disc 33 from the center 31″ of the differential will be the resultant of the movement of the side 31′ of the differential from the follower 12 of cam 1, as previously described, and the correctional movement caused by the displacement of the link 67 from its previously described position. The result of the operations will be a displacement of the contact arm 40 under the combined action of both followers 12 and 62 so that the motor controlled by the contact arm will apply to the side 11'' of differential 11 a displacement which may be regarded as made up of two components, that previously described corresponding to the particular range and altitude with maximum initial velocity and a correctional component for the same range and altitude due to the reduced initial velocity. Otherwise described, the instrument under these conditions subtracts from the line A—B of Fig. 1 the difference between it and the super-elevation curve for a maximum initial velocity and then adds a correction for reduced initial velocity to give the value of the ordinate of the curve A—G corresponding to the super-elevation required for the particular range and altitude of the target for reduced initial velocity of the projectiles. Similarly corrections can be made to any of the curves A—D, A—E, A—F, or intermediate values. It will be evident that the same mechanism used for applying corrections for different initial velocities may be employed in connection with the mechanism associated with cam 1 for computing the values of super-elevation for different types of guns. The elements of the correcting cam mechanism may as described in connection with initial velocity corrections, be inoperative for one type of gun and thus give the values of the super-elevation curve A—H of Fig. 2. By simply shifting the position of the link 67 from that at which it has no effect upon differential 31 to a new position in which it affects the differential the super-elevation values corresponding to the curve A—I are computed by the instrument and indicated by dial 58.

While a preferred embodiment of the invention has been shown and described and one obvious modification of the correcting device has been referred to, it will be understood that the invention may be embodied in other forms and various changes may be made in structural details without departing from its principle as defined in the appended claims.

I claim:

1. In an instrument for computing the value of a quantity which varies with respect to another quantity, the combination of a member, means for displacing the member in accordance with an assumed variation of the first quantity with respect to the second quantity, a second member, means for displacing the second member in accordance with the amount by which the first quantity differs from the assumed variation, a third member, means for displacing the third member in accordance with a factor affecting the values of the first quantity, means operable by said second and third members for combining the displacements of said members, and means operable by said combining means and said first member for combining the displacements of said combining means and said first member.

2. In an instrument for computing the values of a quantity which varies differently with respect to a second quantity for different values of a third quantity, the combination of a member, means for displacing the member in accordance with an assumed variation of the first quantity proportional to the second quantity, a second member, means for displacing the second member comprising a radially and longitudinally variable element mounted for rotary displacement only and a device displaceable radially by and movable longitudinally of said element in accordance with the amount by which the first quantity differs from the assumed variation for various values of the second and third quantities, a third member, means for displacing said third member in accordance with a factor affecting the values of the first quantities, means operable by said second and third members for combining the displacements of said members, and means operable by said combining means and said first member for combining the displacements of said combining means and said first member.

3. In an instrument for computing the value of a quantity which varies with respect to a second quantity, the combination of a member displaceable in accordance with an assumed uniform variation of the first quantity with respect to the second quantity, a second member, displacing means for said second member including an adjustable element mounted for rotation only, said element being radially variable in accordance with the amount by which the first quantity differs from the assumed uniform variation and a device displaceable by and in accordance with the radial variation of said element, a third member operably connected to said second member and adjustable in accordance with corrections to be applied to the adjustment of the second member, means operable from the second member for additional displacement of the first member in accordance with the resultant adjustment of the second member, and means for indicating the resultant displacement of the first member.

4. In an instrument for computing the value of a quantity which varies differently with respect to a second quantity for different values of a third quantity, the combination of a member displaceable in accordance with an assumed variation of the first quantity with respect to the second, a second member, a third member operably connected to said second member to apply corrections thereto, respective adjustable displacing means for said second and third members, each of said means including an element mounted for rotation only and a device responsive to said element, the element in the displacing means for said second member being radially and longitudinally variable in accordance with the amount by which the first quantity differs from the assumed variation for any particular value of the third quantity, and the element in the displacing means for said third member being radially and longitudinally variable in accordance with corrections to be applied to the adjustment of said second member for corresponding particular values of the third quantity, and means operable from the second member for additionally displacing the first member in accordance with the adjustment of the second member.

5. In an instrument for computing the value of a quantity which varies with respect to a second quantity, the combination of an operable element, a member controlling said element to operate the same in direct proportion to movements applied to said member, mechanism for displacing said member in accordance with an assumed uniform variation of the first quantity with respect to the second quantity, means for additionally displacing said member in accordance with the amount by which the first quantities differ from the assumed uniform variation, means for additionally displacing said member in accordance with changes in a factor affecting the value of the first quantity, and means for indicating the resultant displacement of said element.

6. In an instrument for computing super-elevation angles for ordnance, the combination of a cam, means for rotating said cam in accordance with ranges of the point of aim of the projectiles, a follower co-acting with said cam, means for moving the follower axially of the cam in accordance with altitudes of the point of aim of the projectiles, means actuated by the follower in accordance with the super-elevation angles for such ranges and altitudes including a control having a rotatable governing member and a rotatable drive responsive thereto, and means for modifying the actuation of the last named means in accordance with known characteristics of the ordnance connected to said governing member to modify its rotary movement.

7. In an instrument for computing super-elevation angles for ordnance, the combination of a pair of cams, means for rotating the cams in accordance with ranges of the point of aim of the projectiles, a follower coacting with each cam, means for moving the followers axially of the cams in accordance with altitudes of the point of aim of the projectile, means for modifying the effect of the movement of one of the followers in response to movement of the other follower in accordance with a ballistic factor affecting the super-elevation and means controlled jointly by the followers for indicating the super-elevation angles for such ranges and altitudes.

8. In an instrument for computing the value of a quantity which varies with respect to a second variable quantity for different values of a third variable quantity, the combination of a three dimensional cam so formed that the radius of its external contour at any particular axial position represents the amount by which the quantity to be computed differs from an assumed uniform variation of the quantity with respect to one of the variable quantities for a particular value of the other variable quantity, means for turning said cam in accordance with said assumed uniform variation of quantity, a follower coacting with the cam and movable axially thereto, a member separate from a cam also turned by said means that turns said cam in accordance with said assumed uniform variation of the quantity with respect to one of the variable quantities, means actuated by the follower for additionally displacing the member in accordance with the amount by which the quantity to be computed differs from said assumed uniform variation, an adjustable connection introducing mechanism operably connected to said means, and means for indicating the resultant displacement of the member to give the desired quantity.

9. In an instrument for computing a ballistic quantity which varies with respect to the range of the point of aim of a gun, the combination of a member displaceable in accordance with an assumed variation of the quantity with respect to range, means for additionally displacing the member in accordance with the amount by which the quantity differs from said assumed variation, means for further displacing said member in accordance with a given ballistic factor, an adjustable connection between said first and second named means controlled by the latter and settable to avoid displacement of said member by the second named means and also to combine the displacements of both said means to effect a joint displacement of said member thereby, and means for indicating the displacement of the member.

10. In an instrument for computing a ballistic quantity which varies differently with respect to the range of the point of aim of a gun for different altitudes of the point of aim, the combination of algebraic adding mechanism comprising a rotatable member displaceable in accordance with an assumed variation of the quantity with respect to range and another rotatable part engaging said member to impart rotary displacement thereto, means to operate said part to cause it to additionally displace said member in accordance with the algebraic addition of the amount by which the quantity differs from said assumed variation for various values of range for a particular altitude, means for varying the additional displacement of said member in accordance with a given ballistic factor, and means for indicating the resultant displacement of said member.

11. In an instrument for computing a ballistic quantity which varies with respect to the range of the point of aim of a gun for different altitudes of the point of aim and is dependent upon a ballistic factor of the gun, the combination of a member displaceable in accordance with an assumed variation of the quantity with respect to range, and means for additionally displacing said member in accordance with the amount by which the quantity differs for said assumed variation for various values of altitude and for the particular ballistic factor of the gun comprising radially and longitudinally variable elements mounted for angular displacement only, following members for the respective elements coupled for simultaneous displacement axially thereof in accordance with values of altitude of a target, and mechanism adjustable to include or exclude the effect of the ballistic factor in the operation of said means.

12. In an instrument for computing the value of a quantity which varies with respect to a second variable quantity for different values of a third variable quantity, the combination of a rotatable cam, means for rotating the cam in accordance with the value of one of the variable quantities, a frame movably mounted adjacent to the cam, a follower mounted on the frame and coacting with the cam, means for moving the follower axially of the cam in accordance with the value of the other variable quantity, a differential, an operating connection between the frame and one element of the differential, a motor, an operating connection between the motor and a second element of the differential, a device for controlling the motor, an operating connection between the device and the third element of the differential and means actuated jointly by the cam rotating means and the motor for indicating the desired quantity.

13. In an instrument for computing the value of a quantity which varies non-uniformly with respect to another variable quantity for different values of a third variable quantity, the combination of a pair of rotatable cams, means for rotating the cams in accordance with the value of one of the variable quantities, a frame movably mounted with respect to each cam, a follower mounted on each frame and coacting with the corresponding cam, means for moving the followers axially of the cams in accordance with the value of the other variable quantity, a differential, an operating connection between one of the frames and one element of the differential, a motor, an operating connection between the motor and a second element of the differential, a second differential, an operating connection between the third element of the first differential and an element of the second differential, a device for controlling the motor, an operating connection between the device and the second element of the second differential, an adjustable operating connection between the frame of the other cam and the third element of the second differential, means for adjusting the connection in accordance with a factor affecting the value of the first quantity and means actuated jointly by the cam rotating means and the motor for indicating the desired quantity.

14. In an instrument for computing the value of a quantity which varies with the value of a known quantity, a member, means for displacing the member proportionally to the value of the known quantity, a cam, means for rotating the cam proportionally to the known quantity, a follower for the cam, displacing means partly operable by said follower and including a second member displaceable proportionally to the motion of the follower, a second cam connected to said rotating means, a follower for the second cam operable to co-act with the latter displacing means whereby said second member is also displaced proportionally to the motion of the second follower, and rotatable means in cooperative combination with and independently rotatable by said first and second members for combining the total displacement of the second member with the displacement of the first member to compute the value of the quantity.

15. In an instrument for computing the value of a quantity which varies as functions of a plurality of variable quantities, the combination of a member, means for displacing the member proportionally to the value of one of the variable quantities, a plurality of other members mounted for angular displacement only, means for angularly displacing each of said other members as a function of one or more of said variable quantities, means operable by the motion of each of said plurality of members for combining the displacements of said plurality of members, and a second combining means operable by the motion of said first member and the motion of said first combining means for combining the displacements of said first member and said first combining means to obtain the value of the quantity.

16. In an instrument for computing the value of a quantity which varies as functions of a plurality of variable quantities, the combination of a member, means for displacing the member proportionally to the value of one of the variable quantities, a plurality of cams, means for rotating each of said cams proportional to one of said variable quantities, a follower for each of said cams, means for varying the axial position of each of said followers on said cams in accordance with another of said variable quantities, a second member, means for combining the resultant movement of said followers to displace said second member, means actuated in accordance with a variable quantity for varying the effect of the resultant movement of said followers upon the displacement of the second member, and means for combining the displacements of said members to obtain the value of the quantity.

17. In a computing instrument containing a plurality of cams operable to produce values of different quantities and followers engaging the respective cams, means for combining the displacements of said followers, a servo-motor and means actuated by the combining means for controlling the servo-motor.

18. In an instrument for computing the value of a quantity variable according to a plurality of functions, a plurality of conoids mounted for angular displacement only and actuable in accordance with certain of said functions, followers displaceable axially of said conoids actuable in accordance with another of the remaining functions, a multiplier coacting with one of said followers adjustable according to one of said functions, and means for combining the resultant displacement of said followers.

19. In an instrument for computing the value of a ballistic quantity which varies as functions of range and altitude of the point of aim, the combination of a mechanism for computing a ballistic quantity, a member operated thereby in accordance with values of said ballistic quantity, mechanism for computing a required correction to said ballistic quantity, additional mechanism adapted to have no effect upon said second mechanism but independently operable to additionally actuate it for further corrections and means to modify the operation of the first mechanism in accordance with said corrections.

20. In an instrument for computing the value of a quantity which varies with respect to another quantity, the combination of a member, means for displacing the member in accordance with an assumed variation of the first quantity with respect to the second quantity, a second member, means for displacing the second member in accordance with the amount by which the first quantity differs from the assumed variation, means operatively associated with said first mentioned means and operable in accordance with a factor affecting the values of the first quantity, and indirectly actuated means for combining the displacements of said members.

21. In an instrument for computing values of a quantity which varies differently with respect to a second quantity for different values of a third quantity, the combination of a member, means for displacing the member in accordance with an assumed variation of the first quantity proportional to the second quantity, a second member, means for displacing the second member in accordance with the amount by which the first quantity differs from the assumed variation for various values of the second and third quantities, a third member, means for displacing the third member in accordance with a factor affecting the values of the first quantity, variably adjustable mechanism displaceable in accordance with and to combine the displacements of said second and third members, and means responsive to the combining action of said mechanism operable to algebraically combine said combined displacements with the displacement of the first member.

22. In an instrument for computing values of a quantity which varies differently with respect to a second quantity for different values of a third quantity, the combination of a member, means for displacing the member in accordance with an assumed variation of the first quantity proportional to the second quantity, second and third members, means for displacing the former in accordance with the amount by which the first quantity differs from the assumed variation for various values of the second and third quantities and for displacing the latter in accordance with a factor affecting the values of the first quantity, a plurality of variably adjustable interconnected mechanisms operable to combine the displacements of said second and third members, an electric switch and motor correspondingly operable from one of said mechanisms, said motor driving said mechanisms to open said switch, and means under the control of said motor for combining joint measures of the displacements of said second and third members with the displacement of the first member.

23. Apparatus for computing a quantity that is a different function of each of two variables, comprising a member rotatable at a speed that is a function of one variable, the surface of said member being a surface of revolution corresponding to a function, follower means for said surface positionable thereon in accordance with a function, a differential, an operating connection between said follower means and one element of the differential, a motor, an operating connection between the motor and a second element of the differential, a device for controlling the motor, an operating connection between the device and the third element of the differential and means actuated jointly by the cam rotating means and the motor for indicating the computed quantity.

24. Apparatus for computing a quantity that is a function of a second quantity, comprising a member displaceable in accordance with an assumed value of one quantity, a second member, rotatable means associated with said second member, the radius of said rotatable means varying axially thereof in accordance with a function, a third member operably connected to the second member and adjustable in accordance with corrections to be applied to the adjustment of the second member, means operable from the second member for additional displacement of the first member in accordance with the resultant adjustment of the second member, and means for indicating the resultant displacement of the first member.

HANNIBAL C. FORD.